Dec. 2, 1969
V. C. WILSON
3,482,120
METHOD AND APPARATUS FOR THE DIRECT CONVERSION OF
THERMAL TO ELECTRICAL ENERGY
Filed Nov. 25, 1957
2 Sheets-Sheet 1
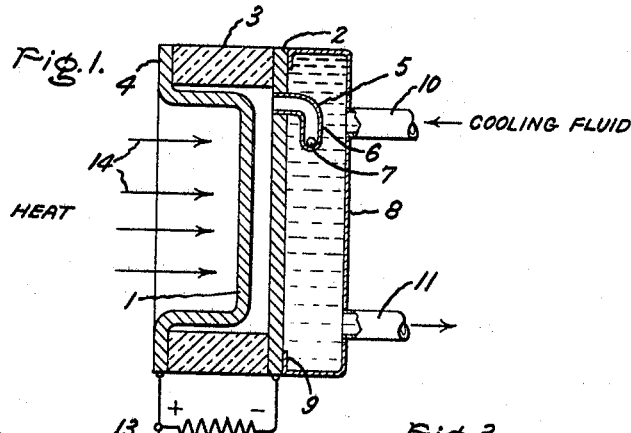
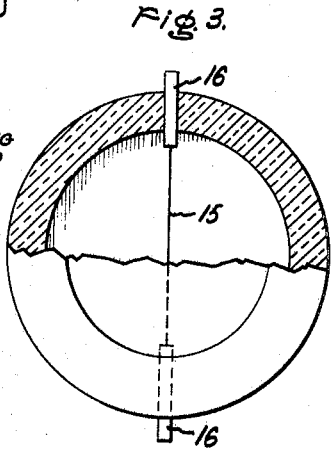
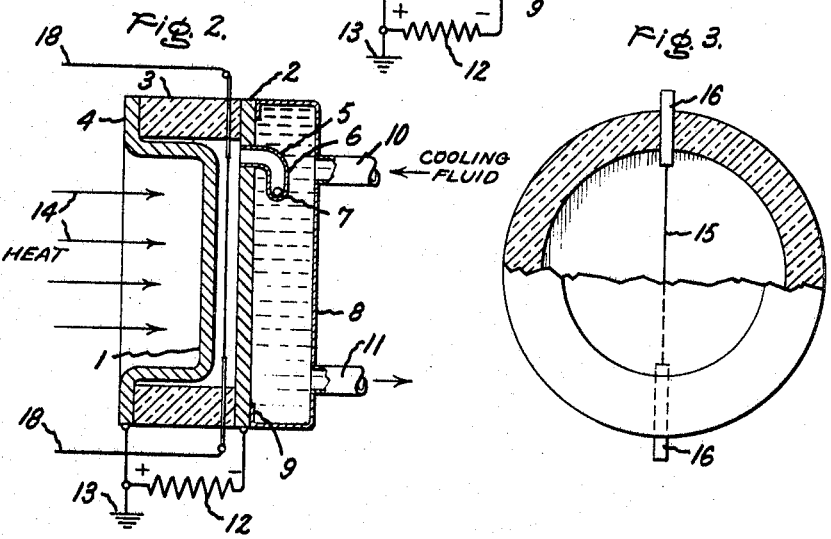
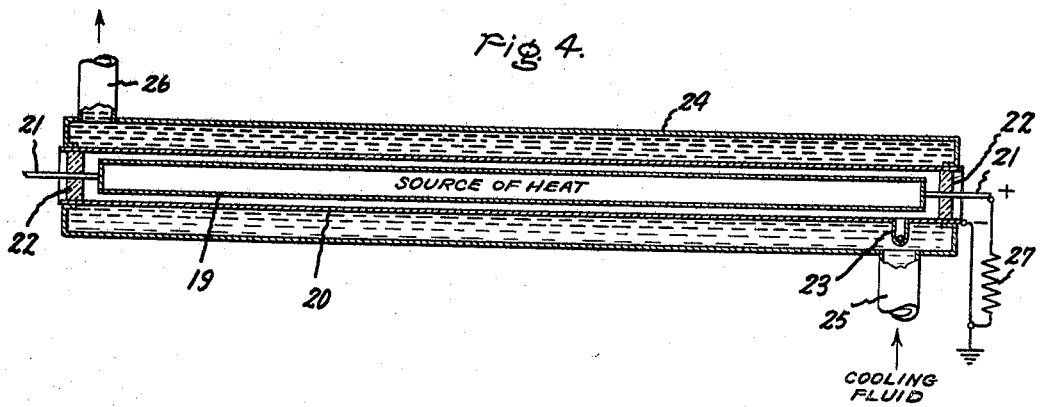
Inventor:
Volney C. Wilson
by Richard R. Brainard
His Attorney.

United States Patent Office 3,482,120
Patented Dec. 2, 1969

3,482,120
METHOD AND APPARATUS FOR THE DIRECT CONVERSION OF THERMAL TO ELECTRICAL ENERGY
Volney C. Wilson, Scotia, N.Y., assignor to General Electric Company, a corporation of New York
Filed Nov. 25, 1957, Ser. No. 698,552
Int. Cl. H02n 3/00
U.S. Cl. 310—4                20 Claims The present invention relates to an improved method and static apparatus for converting thermal energy to electrical energy.

Static devices for the direct conversion of thermal energy to electrical energy are known but the known devices are subject to severe limitations with respect to low operating efficiency, limited power handling capabilities, operating temperatures and the like. For example, ordinary thermocouples utilizing junctions between metals of different work functions operate to producee mall e.m.f.'s which are inherently associated with high resistance circuits and produce very limited electrical power and operate at efficiencies in the order of one percent. With greater availability of new sources of thermal energy such as nuclear reactors and solar energy systems, and new applications for electric energy which could to advantage derive the input energy from thermal sources, such as rockets, satellites and the like, the need for an improved static direct converter of thermal energy into electrical energy is greatly increased.

In accordance with an important aspect of my invention an emitter surface and a collector surface are exposed to the interior of a vacuum tight envelope, preferably in closely spaced relation. The interior of the envelope is evacuated and filled with a vapor, such as cesium vapor. The emitter and collector surfaces are maintained at different temperatures, the emitter being at the higher temperature and the collector at the lower temperature. The emitter is of a higher work function than the collector. This is somewhat the reverse situation from that which would normally be expected but the emission of the collector, even though exhibiting a lower work function, is negligible due to the substantially lower operating temperature. The metallic vapor, such as cesium vapor, provides the low work function of the collector since the cooler collector is entirely coated with cesium, probably in the form of a monatomic layer, while the hotter emitting electrode is only partially covered with cesium the percentage of the surface coated depending upon the temperature of the emitting electrode and the temperature of of the coolest portion of the liquid cesium communicating with the interior of the device.

The use of cesium also has another function and advantage in the device described above in that it provides a source of ions for neutralizing the space charge. The positive cesium ions may be produced by means of an additional electrode spaced from the hot emitter electrode and maintained at a temperature above the emitter electrode, or, the uncoated portion of the emitter electrode may itself be utilized to ionize the cesium vapor. As mentioned above, the portion of the total electrode surface that is coated is dependent upon the temperature of the electrode and the temperature of the liquid cesium (coolest portion of the cesium). For production of cesium ions in this manner it is also necessary that the uncoated portion of the electrode have a work function greater than the ionizing potential of the cesium vapor.

With the space charge substantially neutralized by the cesium ions and with the relatively cool collector electrode having a substantially lower work function than the emitter electrode a substantial portion of the difference in work functions of the two electrodes, which is defined as contact potential, is available as a source of voltage for producing a flow of electricity in an external circuit.

It is an important object of my invention to provide an improved converter of thermal energy to electric energy utilizing the contact potential between an emitting electrode and a cooler collector electrode having a substantially lower work function than the associated emitter electrode.

It is another object of my invention to provide an improved method of converting thermal energy to electric energy in which an ionizable medium is used to neutralize the space charge within the converter and to determine the relative work functions of the electrode surfaces.

Further objects and advantages of my invention will become apparent as the following description proceeds, reference being had to the accompanying drawing and its scope will be pointed out in the appended claims. In the drawing, FIGURE 1 is an elevational view in section of a converter embodying my invention;

FIGURE 2 is an elevational view in section of a modified form of my invention;

FIGURE 3 is a plan view partially broken away of the embodiment of my invention illustrated in FIGURE 2;

FIGURE 4 is a sectional view of an embodiment of my invention in which the source of thermal energy is enclosed within the device and FIGURE 5 is a logarithmic plot of field free emission from a tungsten filament for different liquid cesium temperatures.

Figure 5:
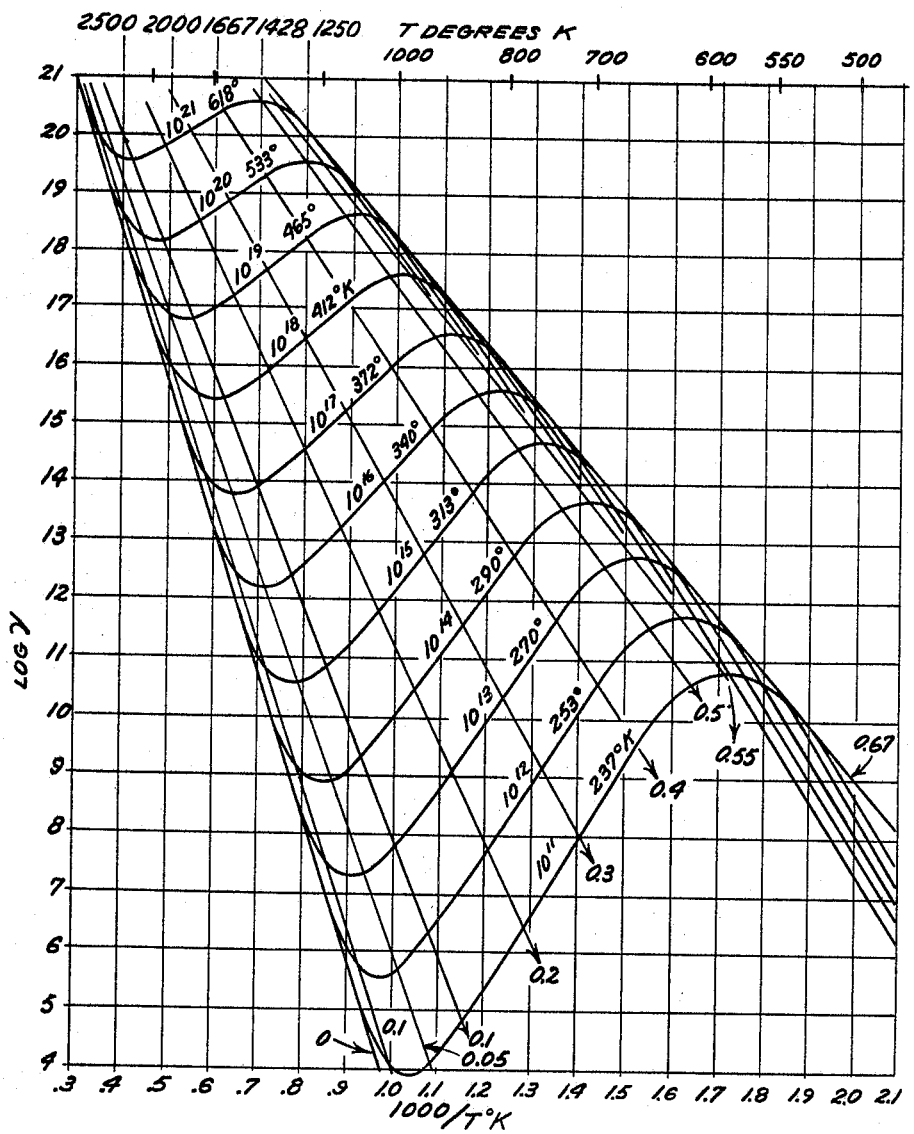

In FIGURE 1 of the drawing I have shown my invention embodied in a generally cylindrical shaped cell having planar electrode surfaces provided by metal disks 1 and 2 sealed to the opposite ends of an annular ceramic insulating member 3. The electrode 1 may be of molybdenum and as illustrated is a substantially cup-shaped member having a peripheral flange 4 bonded to the ceramic insulator 3. The electrode 2 which operates at the lower temperature and is the collector electrode may be formed of silver. The bond between the ceramic and the electrodes may be made in accordance with any of the known processes, due consideration being given to the temperatures to be encountered in the operation of the device and the required resistance of the resulting structure to attack by the metallic vapor to be employed. For example, the ceramic may be first metallized by a process known as the manganese-molybdenum process and then further plated and bonded to the electrode members. Such a process is described in detail and claimed in Patent No. 2,667,-427—Nolte—dated Jan. 26, 1954. As an alternative method, a shim of solder metal and a shim of active metal may be placed between the adjacent surfaces of the ceramic member 3 and the electrodes 1 and 2. The solder metal may be of nickel and the active metal of titanium. The parts are assembled and placed in an enclosure which is evacuated and heated to a temperature sufficient to cause alloying of the shim members and a bonding between the resulting alloy and the ceramic and the brazing to the metallic electrode members.

It will be understood that the temperature encountered at the area of the bond may be made substantially lower than that of the active electrode surfaces by suitable design expedients which introduce a substantial temperature gradient between the bonds and the active electrodes. Thin sections and increased distances between bonds and active electrode surfaces are examples of these expedients.

The silver electrode is preferably oxidized prior to charging the device with a metal vapor such as cesium. This may be done for example by establishing an arc between the electrodes while the device is filled with oxygen at a small pressure. Positive ions bombarding the surface which is maintained at a negative voltage tend to create a silver oxygen surface.

A reservoir for holding a quantity of readily vaporizable metal is provided by a tubulation 5 having a depending portion 6 in which a small quantity of the metal 7 is retained. The metal may be cesium, potassium, or rubidium but cesium is preferred. Cesium metal will be referred to in the remainder of the description and in the claims but it will be understood that potassium or rubidium may also be used. The tubulation communicates at one end with the space between the electrodes to supply cesium vapor thereto at a pressure dependent upon the temperature of the coolest surface to which it is exposed. The temperature of the cooler collector electrode 2 is maintained by providing a hollow cylindrical jacket 8 bonded at its outer periphery 9 to the electrode and having inlet and outlet passages 10 and 11 for directing fluid in heat exchanging relation with the outer surface of the electrode. As illustrated, the inlet passage 10 is located opposite the tubulation 5 so that the cesium is maintained at a lower temperature than that of any other interior surface of the device.

An electric load illustrated as a resistor 12 is connected between the electrodes 1 and 2 and as indicated the positive output terminal of the device is associated with the hot emitting electrode 1. This terminal may be grounded as illustrated at 13.

With the particular materials described above and with a small spacing in the order of a few thousandths of an inch between the electrode surfaces, preferably less than ten one-thousandths of an inch, the operation is as follows: The molybdenum electrode 1 is heated by a source of thermal energy illustrated schematically by the arrows 14 which may be the heat concentrator of a solar system or the hot wall of a nuclear reactor. As far as the device itself is concerned a simple burner may provide the heat energy required. In such a case the metal of electrode 1 should be resistant to oxidation or corrosion or should be protected by a suitable coating. The operating temperature of the molybdenum electrode and the temperature of the cesium are interdependent and are chosen to provide a balance between the emission desired from the hot electrode 1 on the one hand and the portion of that electrode which is coated with cesium on the other. This latter parameter is also a measure of the ability of the electrode 1 to produce positive cesium ions from the cesium vapor and a measure of its average work function. In a particular device, the temperature of the hot electrode is maintained at about 1800° K. At such a temperature and with the cesium reservoir at a temperature of about 618° K. the surface of electrode 1 is about 17 percent covered with cesium. The collector electrode 2 is subjected to the cooling action of a cooling fluid, either liquid or gas, to maintain the temperature thereof above 618° K. and preferably at least 700° K. At this temperature the electrode will be completely coated with cesium and will have a very low work function. The cesium oxygen silver surface has a work function of about .7 volt. Under the conditions specified the average work function of the hot electrode 1 will be approximately 3.3 volts and the space charge due to the electrons in the space between electrodes 1 and 2 is substantially neutralized by the positive cesium ions.

From the foregoing detailed description, it is believed apparent that a substantial portion of the contact potential between the two electrodes is available to cause a flow of current in an external circuit such as resistor 12 connected between the electrodes 1 and 2. The flow of electrons is from the hot higher work function electrode 1 to the cooler lower work function electrode 2 so that the voltage is of a polarity to cause a flow of electrons in an external circuit from the cold electrode to the hot electrode or, in other words, to produce a flow of positive current from the hot electrode to the cold electrode through the external circuit, as indicated by the polarity signs of FIGURE 1.

From the foregoing description it is seen that several important temperature relationships and resulting physical conditions are involved in the carrying out of my invention. The emitter and collector electrodes are maintained at substantially different temperatures with the emitter electrode the hotter electrode. The work function of the hotter electrode is higher than that of the collector electrode. The difference in temperature between the two surfaces is sufficient so that the electron emission from the lower work function collector electrode is negligible compared to the emission from the hot electrode, e.g., in the order of 1% or less. The work functions in the particular embodiment illustrated are determined largely by the cesium layers on the electrode surfaces and the amount of the electrode which is coated with cesium is, in turn, dependent upon the electrode temperature and the temperature of the liquid cesium. In this way, the cesium is a convenient means of providing the desired relative work functions for the hot and cold electrodes. In addition, the cesium provides a source of positive ions. In the embodiment just described the ionization is produced by the uncoated portion of the hot electrode. As will be described later in connection with the modification illustrated in FIGURES 2 and 3 a means separate from the emitting electrode 1 may be provided for producing the ionization if desired.

A number of different materials are suitable for both the hot and cold electrodes. With respect to the hot or emitter electrode it is desirable that the vapor pressure be low at the temperature of operation. For this reason, the relatively refractory metals such as molybdenum, tungsten and tantalum are desirable, although for lower operating temperatures nickel is also satisfactory.

The electrode material for the cooler electrode may also be selected from a number of different metals. While the silver-oxygen-cesium surface described in connection with FIGURE 1 provides the lowest work function known at this time, acceptable low work functions may also be provided with the metal of the base selected from such materials as molybdenum, nickel, tantalum, iron and alloys such as stainless steel. In the case of each of these materials it is desirable to provide an oxide surface by bombarding with positive oxygen ions as described in connection with the silver electrode of FIGURE 1.

Since the device as described above is a device for converting thermal energy it is governed by thermodynamic principles and the theoretical or Carnot efficiency is measured by $$\frac{T_h - T_c}{T_h}$$

where $T_h$ and $T_c$ indicate the temperatures in degrees Kelvin of the hot and cold electrodes, respectively. It is therefore desirable to have the difference in temperature between the electrodes as large as possible relative to the temperature of the hotter electrode in order to provide a reasonably high theoretical efficiency. Temperature differences of 700° K. and above work out satisfactorily.

In the above specific example the temperature of the hot electrode is 1800° K. While the exact temperatures are not important it is desirable to operate the hot electrode at a sufficiently high temperature to provide copious emission. The considerations involved may be better understood from a consideration of FIGURE 5 which is a plot of the logarithm of the field free electron emission in electrons per square centimeter from a tungsten filament in equilibrium with cesium vapor at the filament temperature T° K. versus 1000/T° K. At the top of the plot temperature in degrees K. are designated. The curved lines are labeled with the temperature of the liquid cesium and the straight sloping lines are designated with the fraction of the total surface of the filament which is coated with cesium under the temperature conditions. For 1800° K. and a cesium temperature of 618° K. it will be noted that the logarithm of the emission is about 20.1. This is given in electrons per square centimeter. At this temperature about 30% of the filament is coated with cesium. If the temperature were dropped to 1400° K. and the cesium maintained at the same temperature the emission would increase due to the upward slope of the emission curve to approximately 20.6. However the portion of the electrode coated wth cesium would increase to about 50% with a corresponding decrease in the work function. This would materially decrease the available contact potential. For 1400° K. for the hot electrode and with two tenths of the electrode coated with cesium which would provide a work function near that given in connection with the 1800° K. example the logarithm of the emission would drop to 16.2. This is a reduction in the emission by approximately a factor of 104.4. Thus it will be seen that the operating temperature of the electrodes and the cesium bath involves, in addition to the consideration of the materials of the device, a balancing between the emission and work function. A good workable range for the hot electrode extends from 1400° K. to 2000° K. with 700° K. and up for the colder electrode. The temperature of the cesium bath will be always less than that of the colder electrode by an amount which will insure that the colder electrode is not too heavy coated with the cesium vapor. The work function changes little as the coated area increases above 67% as long as only a single or monatomic layer exists. Thicker layers of cesium result in an increase in the work function.

In FIGURES 2 and 3 I have shown a modification of my invention which in general structural arrangement is the same as FIGURE 1 and the same reference numerals have been employed to designate corresponding parts. In addition, a tungsten filament 15 extends across the diameter of the device closely spaced with respect to both electrode surfaces a distance in the order of .001 or .002 of an inch. As illustrated, the filament is supported from heavier lead-in conductors 16 sealed through the ceramic 3. The filament is maintained at the desired temperature which is higher than the temperature of the electrode 1 by electrically heating with direct current supplied through conductors 18. In the device of FIGURES 2 and 3 the operation is essentially as described in connection with FIGURE 1 except that the ionization of the cesium vapor is accomplished by the tungsten filament 15 rather than by that portion of the electrode 1 which is not coated with cesium. It will be readily appreciated by those skilled in the art that in its broader aspect the present invention contemplates the neutralization of space charge by the presence of positive ions between the electrode surfaces whether or not they are generated in that location. If desired the positive ions may be injected into the space from a suitable ion source exterior of the device. However, the preferred arrangements illustrated accomplish this function in a very simple manner.

In FIGURE 4 I have shown the present invention in a modified form which is particularly adapted for converting thermal energy generated within a hollow electrode corresponding to the emitting electrode 1 of FIGURES 1 and 2. As shown in FIGURE 4 the device includes a pair of concentric cylindrical electrodes 19 and 20 which may both be formed of molybdenum, for example, and which are of different diameters by an amount so that the opposed surfaces are closely spaced. Rod-like extensions 21 from the ends of the inner cylinder which is closed at its opposite ends are provided to support the inner cylinder from annular insulating disks 22 of ceramic which space and seal the cylinders with respect to one another to provide the interelectrode space within which a metal vapor may be introduced from the reservoir 23. The inner tube and hotter electrode which supplies the electron emission may be heated by any heating medium which is consumed within the cylinder or passes through the cylinder (which in such case would be open-ended). However, such an arrangement may be used to advantage for converting energy produced by nuclear reaction utilizing uranium oxide fuel. The fuel is contained within the closed cylinder and the outer or cooler electrode is surrounded by a cylindrical jacket 24 having inlet and outlet passages 25 and 26. Any conventional coolant for a nuclear reactor, such as high pressure water, liquid sodium or the like to maintain the temperature at about 700° K. This temperature is sufficient so that the thermal energy may be used in presently accepted ways of utilizing the thermal energy carried off by the reactor coolant. In this way, the electrical conversion would take place over a temperature range well adapted for application to the conversion of electricity from a nuclear reactor. As in the previous embodiments the electrical load 27 is connected between the hot and cold electrodes 19 and 20, respectively, with the positive terminal connected to the hot electrode.

In the application of the present invention to a very large area device of concentric cylindrical configuration, for example, such as described in connection with FIGURE 4, the problem of maintaining the desired small spacing between the electrode surfaces is substantial. This problem may be minimized by applying to one of the electrodes preferably the inner eletrcode a scattered coating of aluminum oxide particles which are adhered to the metal and lapped to provide a minimum mechanical spacing between the active electrode surfaces. It is to be understood that the aluminum oxide particles do not occupy a major portion of the total volume or cover a very large surface of the hot electrode so that the operation of the device from the standpoint of emission of electrons, work functions and the dispersal of the cesium ions in the interelectrode space is not hampered.

It is believed clear from the foregoing description that the present invention provides a new method and apparatus for converting thermal energy to electrical energy directly in static apparatus at a relatively high temperature by utilizing two electrode surfaces of different work functions and operating them at different temperatures so that the higher work function material is at the higher temperature and functions to emit a copious supply of electrons. With this arrangement and with additional provision of means for neutralizing the space charge the difference in the work functions or contact potential is to a very substantial degree available for causing the flow of current in an external circuit with a voltage which is positive at the terminal associated with the emitting or high temperature electrode.

While particular embodiments of my invention have been described it will be apparent to those skilled in the art that changes and modifications may be made without departing from my invention in its broader aspects and I aim therefore in the appended claims to cover all such changes and modifications as fall within the true spirit and scope of my invention.

What I claim as new and desire to secure by Letters Patent of the United States is:

1. An energy converting system for converting thermal energy to electrical energy comprising, a device having two conductive electrodes supported in closely spaced and insulated relation with surfaces of said electrodes exposed to the interior of a vacuum tight enclosure, a reservoir communicating with said enclosure, a quantity of cesium in said reservoir, means supplying heat to one of said conductive electrodes to maintain the temperature thereof above 1400° K., means for maintaining the other of said electrodes at a temperature several hundred degrees K. lower than the temperature of said first electrode and means maintaining said reservoir at a temperature substantially below the temperature of either of said electrodes so that the hotter of said electrodes is partially coated with cesium and the cooler of said electrodes is completely coated with cesium whereby the electron emission of the hotter electrode is enhanced by the partial coating of cesium thereon and has a higher work function than the cooler electrode and electrons emitted by said hotter electrode are collected by said cooler electrode and the difference between the work functions of said electrode surfaces provides a voltage for supplying current to an external circuit, the positive terminal of the device being provided by the warmer of said electrodes and said cesium vapor between said electrode surfaces providing positive ions for substantially neutralizing space charge within said device.

2. An energy converting system for converting thermal energy to electrical energy comprising, a device having two conductive electrodes supported in closely spaced and insulated relation with surfaces of said electrodes exposed to the interior of a vacuum tight enclosure, a reservoir communicating with said enclosure, a quantity of cesium in the reservoir, means supplying heat to one of said conductive electrodes to maintain it at an elevated temperature, means for maintaining the other of said electrodes at a temperature several hundred degrees lower than the temperature of said first electrode and means maintaining said reservoir at a temperature substantially below the temperature of either of said electrodes so that the hotter of said electrodes is substantially less than half coated with cesium and the cooler of said electrodes is substantially more than half coated with cesium whereby the hotter electrode has a higher work function than the colder electrode and electron emission of said hotter electrode is enhanced by the partial coating of cesium thereon and the electrons emitted thereby are collected by said cooler electrode and provide a voltage for supplying current to an external load, the positive terminal of the device being provided by the hotter of the electrodes and said cesium vapor within said enclosure providing positive ions for substantially neutralizing space charge between said electrode surfaces.

3. An energy converting system for converting thermal energy to electrical energy comprising, a device having two elongated cylindrical conductive electrodes supported in concentric and insulated relation to provide annular interelectrode space, means communicating with said space for supplying cesium vapor thereto, means within the inner one of said cylindrical electrodes generating thermal energy to maintain said electrode at a temperature above 1400° K. to provide a copious supply of electrons in the space between said electrodes, means maintaining the outer of said electrodes at a temperature at least several hundred degrees K. lower than the temperature of said inner electrode to maintain a monatomic layer of cesium over substantially the entire inner surface of said outer electrode, the vapor pressure of cesium within the device and the operating temperature of said inner electrode maintaining a partial coating of cesium thereon to enhance the electron emission therefrom and provide a substantially higher work function than said outer electrode so that a substantial contact potential exists between said electrodes of a polarity to supply current to an external circuit connected between said electrodes and with the terminal associated with the inner one of said electrodes positive.

4. The method of converting thermal energy to electrical energy with a device including a pair of electrode surfaces supported in closely spaced and insulated relation within an evacuated enclosure which comprises supplying heat to one of said electrodes to maintain a temperature thereof above 1400° K., maintaining the other of said electrodes at a temperature several hundred degrees K. below that of the first electrode, supplying cesium vapor to the space between said electrodes at a pressure corresponding to a temperature substantially below that of the lower temperature electrode to provide a complete coating of cesium on the cooler of said electrodes and a partial coating of cesium on the warmer of said electrodes to enhance the electron emission therefrom and provide a higher work function of said warmer electrode than of said cooler electrode, the high temperature of said one electrode providing substantial electron emission therefrom and the cesium vapor providing positive ions for substantial neutralization of the space charge between said electrodes whereby a voltage is available between said electrodes for providing a current to an external circuit and said voltage having a maximum value which approaches the contact potential between said two electrode surfaces.

5. A thermionic device for converting thermal energy into electrical energy including an envelope, a cathode, a source of thermal energy for supplying heat to said cathode, an anode and cesium vapor located at least partially between said cathode and said anode during operation, said cathode having an electron emissive surface having a work function greater than the ionization potential of cesium, said electron emissive surface, during operation, being at a temperature adequate to produce substantial thermionic emission and being at a higher temperature than said anode, said cesium vapor pressure, during operation, being between 0.01 and 20 mm. of mercury.

6. A thermionic device for converting thermal energy into electrical energy including an envelope, a cathode, a source of thermal energy for supplying heat to said cathode, an anode and cesium vapor located at least partially between said cathode and said anode during operation, said cathode having an electron emissive surface having a work function greater than the ionization potential of cesium, said electron emissive surface, during operation, being at a temperature of at least 1000° C., said anode being at a temperature below 1000° C., said cesium vapor pressure, during operation, being between 0.01 and 20 mm. of mercury.

7. A thermionic device for converting thermal energy into electrical energy including an envelope, a cathode, a source of thermal energy for supplying heat to said cathode, an anode and alkali metal vapor located at least partially between said cathode and said anode during operation, said cathode having an electron emissive surface having a work function greater than the ionization potential of said alkali metal, said electron emissive surface, during operation, being at a temperature adequate to produce substantial thermionic emission and being at a higher temperature than said anode, said electron emissive surface work function being higher than the work function of said anode during operation, portions of said envelope, said cathode and said anode being exposed to said alkali metal vapor, said exposed portions being at a temperature above 150° C. during operation.

8. A thermionic device for converting thermal energy into electrical energy including an envelope, a cathode, a source of thermal energy for supplying heat to said cathode, an anode and alkali metal vapor located at least partially between said cathode and said anode during operation, said cathode having an electron emissive surface having a work function greater than the ionization potential of said alkali metal, said electron emissive surface during operation, being at a temperature adequate to produce substantial thermionic emission and being at a higher temperature than said anode, portions of said cathode being operable to ionize said alkali metal vapor on contact during operation thereby forming alkali metal ions, said alkali metal ions being operable to reduce space charge.

9. An energy converting system for converting thermal energy to electrical energy comprising a device having two conductive electrodes supported in mutually spaced and insulated relation with surfaces of the electrodes exposed to the interior of a vacuum tight enclosure, a quantity of liquid cesium communicating with the interior of said enclosure, means supplying heat to one of said conductive electrodes to maintain it an elevated temperature, means for maintaining the other of said electrodes at a temperature several hundred degrees lower than the temperature of said first electrode and means maintaining said liquid cesium at a temperature substantially below the temperature of each of said electrodes so that the hottest of the electrodes is substantially less than half coated with cesium and the coolest of the electrodes is substantially more than half coated with cesium whereby the hotter electrode has a higher work function than the cooler electrode and the electron emission of said hotter electrode is enhanced by the partial cesium coating thereon and the electrons emitted thereby are collected by said cooler electrode and provide a voltage for supplying current to an external load, the positive terminal of the device being provided by the hotter of said electrodes and the cesium vapor within the device being ionized to substantially neutralize space charge between said electrode surfaces.

10. An energy converting system for converting thermal energy to electrical energy comprising a device having conductive electrodes supported in mutually spaced and insulated relation with surfaces of said electrodes exposed to the interior of a vacuum tight enclosure, an additional conductor within said enclosure and mutually insulated and spaced from both of said surfaces, a quantity of liquid cesium communicating with the interior of said envelope, means for supplying heat to one of said conductive electrodes to maintain it at an elevated temperature, means for maintaining the other of said electrodes at a temperature several hundred degrees lower than the temperature of said first electrode, and means maintaining said liquid cesium at a temperature substantially below the temperature of either of said electrodes so that the hotter of said electrodes is substantially less than half coated with cesium, and the cooler of said electrodes is substantially more than half coated with cesium, whereby the hotter electrode has a higher work function than the colder electrode and electron emission from said hotter electrode is enhanced by the cesium thereon, and the electrons emitted thereby are collected by said cooler electrodes and provide a voltage for supplying current to an external load and means for energizing said additional conductor independently of said first-named conductive electrodes to control the formation of positive cesium ions thereby and thereby control the neutralization of space charge between the conductive electrodes.

11. A discharge device comprising an envelope containing a thermionic cathode having a relatively low work function, means for heating said cathode to electron-emitting temperature, and means for producing positive ions in said envelope independently of ionization by electron impact, for neutralizing the space charge of the electrons emitted by said cathode; said ion producing means comprising an ion producing electrode insulated from said cathode and having a work function substantially higher than said cathode work function, and means for heating said electrode to ion producing temperature.

12. A low temperature thermionic energy converter comprising an envelope containing a thermionic cathode having a relatively low work function, means for heating said cathode to electron emitting temperature, a collector spaced from said cathode, and means for producing positive ions in the space between said cathode and said collector independently of ionization by electron impact for neutralizing the space charge of the electrons emitted by said cathode; said ion producing means comprising an ion producing electrode electrically insulated from said cathode and said collector and having a work function substantially higher than said cathode, and means for heating said electrode to ion producing temperature.

13. A low temperature thermionic energy converter according to claim 12 including an output impedance including no voltage source connected directly between said cathode and said collector.

14. A low temperature thermionic energy converter according to claim 12, wherein the work function of said collector is substantially lower than the work function of said cathode.

15. A low temperature thermionic energy converter comprising an envelope containing at least one ionizing electrode element having a given work function, at least one thermionic cathode element having a work function substantially less than said given work function, means for heating said elements, a collector, and a quantity of ionizable gas atoms having an ionization potential between the work functions of said ionizing electrode element and said cathode element, said ionizing electrode element being electrically insulated from said cathode element.

16. A thermionic energy converter according to claim 15 wherein said cathode and ionizing electrode elements are disposed in close-spaced relation.

17. Means for converting kinetic or radiant energy into electrical energy without an external voltage source comprising in combination a first electrically conductive sheet of refractory material having at least a part of one surface available for exposure to said kinetic or radiant energy to raise its temperature thereby, a second electrically conductive sheet spaced from the opposite surface of said first sheet available to thermal means for controlling its temperature, closure means connecting said sheets in electrically insulating relationship to define a gastight chamber between said sheets, and a partial filling of an alkali metal in said chamber, said chamber being otherwise exhausted to a high vacuum, said sheets being available for connection to an external electrical circuit, said first sheet being at a very high electron emission temperature, not less than 1500° K., and said second sheet being at a much lower temperature, sufficient to maintain said alkali metal at a pressure of from $10^{-5}$ to 10 mm. Hg.

18. A thermoelectric transducer operable without an external source of voltage comprising a first electrically conductive plate disposed to receive sensible heat on one surface and with a melting point not less than 1800° C., a second electrically conductive plate disposed adjacent the opposite surface of said first plate, said plates being insulated from each other by means which together with said plates define a gastight chamber having an atmosphere therein of a vapor of an alkali metal, a partial filling in said chamber of an excess of said alkali metal in a non-vapor form, means for heating said first plate to a high electron emission temperature below its melting point, not less than 1500° K., and the balance of the structure defining said chamber to a temperature sufficient to partially vaporize said filling of said alkali metal to obtain a predetermined particle density in said chamber of from $10^{12}$ to $10^{17}$ particles per cubic centimeter, and electrical connections from said plates.

19. A thermoelectric cell comprising an electrically conductive core self-heated to a temperature below its melting point in the range of 1800 to 4000° C., a surrounding electrically conductive shell, electrically insulating means spacing said shell from said core to define a gastight chamber between said core and said shell, a partial filling of an alkali metal vapor in said chamber, said chamber otherwise being exhausted to a hard vacuum, and electrically conductive means to deliver power from said core and said shell, said shell being at a much lower temperature than said core, said temperature being no lower than the minimum necessary to maintain said alkali metal in the vapor state.

20. An energy converting system for converting thermal energy to electrical energy comprising, a device having two conductive electrodes supported in closely spaced and insulated relation with surfaces of said electrodes exposed to the interior of a vacuum tight enclosure, a quantity of cesium in said envelope, means supplying heat to one of said conductive electrodes to maintain the temperature thereof above 1400° K., means for maintaining the other of said electrodes at a temperature several hundred degrees K. lower than the temperature of said first electrode and means maintaining said liquid cesium at a temperature at least as low as the temperature of said other of said electrodes, the temperature of both said electrodes and said liquid cesium being correlated so that both of said electrodes are at least partially coated with cesium whereby the electron emission of the hotter electrode is enhanced by the partial coating of cesium thereon and has a higher work function than the cooler electrode and electrons emitted by said hotter electrode are collected by said cooler electrode and the difference between the work functions of said electrode surfaces provides a voltage for supplying current to an external circuit, the positive terminal of the device being provided by the warmer of said electrodes and said cesium vapor between said electrode surfaces providing positive ions for substantially neutralizing space charge within said device.

References Cited

UNITED STATES PATENTS

| | | |
|---|---|---|
| 2,510,397 | 6/1950 | Hansell. |
| 2,759,112 | 8/1956 | Caldwell. |
| 2,437,576 | 3/1948 | Wick. |
| 2,863,074 | 12/1958 | Johnstone. |
| 2,899,590 | 8/1959 | Sorg et al. |

OTHER REFERENCES

Thermionic Effects Caused by Vapors of Alkali Metals, from the Proceedings of the Royal Society, A, vol. 107, 1925, by I. Laugmuir et al. (pp. 61–64).

J. D. MILLER, Primary Examiner

D. F. DUGGAN, Assistant Examiner